United States Patent [19]

Dyer

[11] Patent Number: 4,753,410
[45] Date of Patent: Jun. 28, 1988

[54] SIDE VIEW MIRROR EXTENSION

[76] Inventor: William B. Dyer, 3358 Taylor Rd., Central Point, Oreg. 97502

[21] Appl. No.: 56,428

[22] Filed: Jun. 1, 1987

[51] Int. Cl.$^4$ ............................................. B60R 1/06
[52] U.S. Cl. .................................... 248/480; 248/298
[58] Field of Search .................... 248/480, 476, 475.1, 248/298, 297.1; 350/631, 639; 403/104, 109, 92, 80, 61

[56] References Cited

U.S. PATENT DOCUMENTS

| | | | |
|---|---|---|---|
| 3,383,694 | 5/1968 | Strohmeyer, Jr. | 403/109 X |
| 3,697,031 | 10/1972 | Glickman et al. | 403/61 X |
| 3,698,798 | 10/1972 | Bolton | 350/639 |
| 4,451,021 | 5/1984 | Merriss | 248/480 |

FOREIGN PATENT DOCUMENTS 457497  11/1936  United Kingdom ................ 248/298

Primary Examiner—David L. Talbott
Attorney, Agent, or Firm—James D. Givnan, Jr.

[57] ABSTRACT

An elongate plate slotted for a major portion of its length receives a fastener for adjustably securing the plate to the side view mirror bracket of a vehicle. The plate has a lengthwise extending shoulder which abuts an edge of the side view mirror bracket of the vehicle to assure plate and bracket alignment. The plate defines an opening offset to one side from the elongate opening and shoulder of the plate and receives a fastener securing a side view mirror to the plate and permits side view mirror retraction proximate the original position of the mirror on the side view bracket of the vehicle.

2 Claims, 1 Drawing Sheet

SIDE VIEW MIRROR EXTENSION

BACKGROUND OF THE INVENTION

The present invention pertains generally to automotive side view mirrors located on or proximate the front doors of vehicle.

In wide use today are side view mirrors located on door mounted brackets having a horizontal segment which is apertured to receive a fastener in upwardly threaded engagement with a threaded boss on the underside of the mirror. Such side view mirror mounting arrangements make no provision for outward adjustment of the mirror for purposes of viewing a different rearward area. Accordingly, when the vehicle is used to tow trailers or carry camper units, the vehicle must be fitted with auxiliary side view mirrors at considerable cost and mounting effort to the vehicle owner. Such auxiliary mirrors increase the total width of the vehicle and accordingly, for purposes of convenience, are not left in place once the special use of the vehicle is completed. A problem encountered with such auxiliary mirrors is their susceptibility of damage by accidental contact with an obstruction and, accordingly, such auxiliary mirrors often incur risk of damage to the mirror and the mirror mounting arrangement.

One effort to provide a solution to the foregoing problem is the mirror extension assembly disclosed in U.S. Pat. No. 4,451,021 wherein an elongate member is superimposed on a horizontal segment of a mirror bracket with the member apertured at one end to receive a mirror attaching fastener and with a lengthwise slot permitting inward and outward adjustment of the member. A problem exists in any side view mirror arrangement in maintaining the mirror at the desired angular relationship with the driver of the vehicle as vibration or forces occurring during door closing tend to alter said relationship. A further problem is providing an adequate range of adjusted positions and particularly an extreme retracted position.

SUMMARY OF THE PRESENT INVENTION

The present invention is embodied within a side view mirror extension having a wide range of adjusted positions relative a permanent mirror bracket of the vehicle.

The present extension is adapted for sliding engagement with the original equipment mirror bracket to permit positioning of the mirror both outwardly away from the vehicle as well as inwardly to a retracted position to diminish the risk of accidental contact with an obstruction such as garage door jamb. The extension includes a shouldered area, which along with an extension mounting fastener, prevents rotational displacement of the side view mirror from vibrational or forces occurring during door closing. Laterally offsetting a mirror mounting aperture from a lengthwise extending slot in the extension permits side view mirror to be retracted to a position inward of the mirror position possible with the original equipment bracket.

Important objectives of the present extension include a side view mirror extension permitting a wide range of mirror locations to preclude the purchase and installation of auxiliary side view mirrors; the provision of a side view mirror extension of highly durable construction shape so as to enable production as by extrusion methods resulting in a low cost of manufacture; the provision of a side view mirror extension that locates the side view mirror laterally offset from the original bracket and which prevents mirror vibration by reasons of its rigid construction.

BRIEF DESCRIPTION OF THE PREFERRED EMBODIMENT

Figure 1:
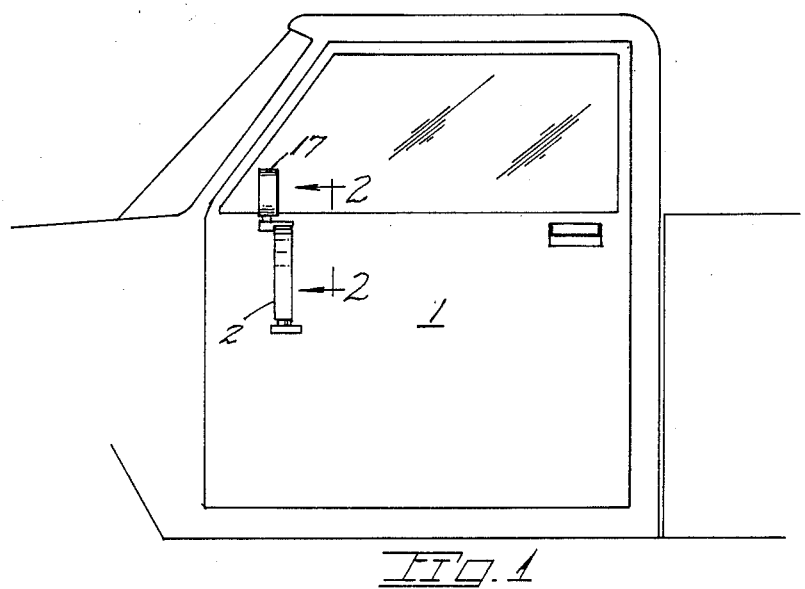
FIG. 1 is an elevational view of a vehicle door equipped with the present extension.
Figure 2:
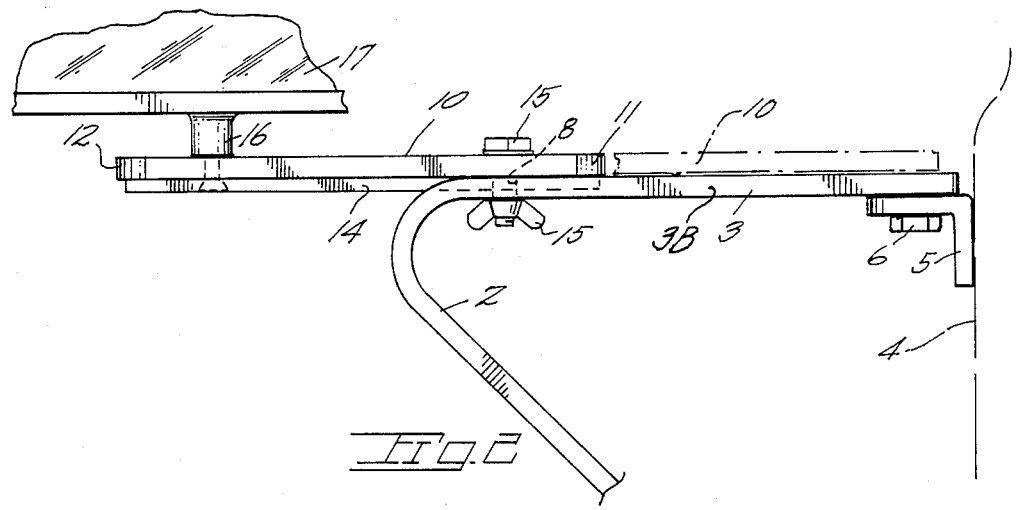
FIG. 2 is an elevational view taken approximately along the line 2—2 of FIG. 1.

With continuing attention to the drawings wherein applied reference numerals indicate parts similarly hereinafter identified, the reference numeral 1 indicates a vehicle door such as that of a pick up truck equipped with a side view mirror bracket 2.

Bracket 2 has a horizontal segment 3 normally disposed generally perpendicular to an upright door surface at 4 and attached thereto by angular supports 5 and coupling members at at 6. Such side view mirror brackets are commonly apertured at 8 adjacent their outer extremity or apex to receive a mirror engaging fastener. Bracket 2 extends downwardly in an inclined manner from its outer extremity and terminates at a second door mounted support member not shown.

The present extension is indicated at 10 and is of elongate shape having inner and outer ends at 11 and 12 which may be curved to avoid angular corners. As viewed in FIG. 3, the extension defines a lengthwise slot 13 which terminates at its ends adjacent the curved ends 11 and 12 of the extension. Said slot is laterally offset from a shoulder 14 of the extension which engages a forward edge 3A of bracket 3. A fastener assembly 15 extends through slot 13 and serves in conjunction with shoulder 14 to attach the extension for linear sliding movement relative the horizontal portion of bracket 3 while preventing misalignment of the extension with bracket 3.

The extension 10 includes a marginal portion 10A which is apertured at 19 adjacent its outer end to receive a threaded fastener which upwardly engages a threaded mirror boss 16 on the underside of a side view mirror 17. Aperture 19 is laterally offset in one direction from the longitudinal axis at A of the extension while slot 13 is oppositely offset from said axis. Marginal portion 10A is of increased vertical section and prevents any vibratory movement of the mirror.

Figure 3:
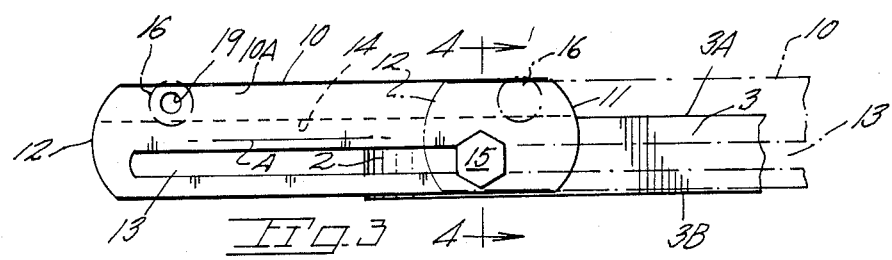
FIG. 3 is a horizontal sectional view taken downwardly along line 3—3 of FIG. 2 with the extension shown in an extreme retracted position in broken lines.
Figure 4:
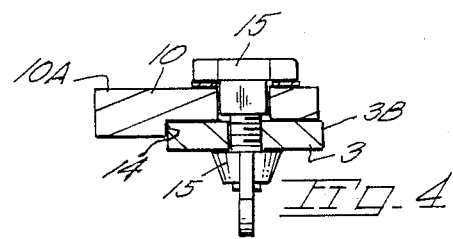
FIG. 4 is a sectional view taken along line 4—4 of FIG. 3.

The present extension is fully retracted when the vehicle is returned to normal use with inward retraction of the extension, as shown in FIG. 3, resulting in the side view mirror being located at, or even inward of the original bracket mounted mirror position when mirror boss 16 is secured by a fastener extending through opening 19. A wing nut type fastener 15 enables the vehicle operator to conveniently position extension 10 and mirror 17. The present extension, while shown and described in conjunction with the driver's or left side front door of a vehicle, is equally adapted for mounting on the right front door of the vehicle in which instance shoulder 14 would engage trailing edge 3B of a bracket 3. Alternatively, a second aperture may be formed at the remaining end of the extension to receive a mirror attaching fastener. The present extension is not susceptible to accidental misalignment with bracket 3, as earlier noted, even after long periods of use subjecting the extension to substantial forces as occur with repeated and forceful door closings.

While I have shown but one embodiment of the invention, it will be apparent to those skilled in the art that the invention may be embodied still otherwise without departing from the spirit and scope of the invention.

Having thus described the invention, what is desired to be secured in a Letters patent is:

1. A side view mirror extension for attachment to a horizontal segment of a side view mirror bracket of a vehicle, said segment having a vertical edge and an aperture for reception of a fastener, said extension comprising, an elongate plate having a slot extending lengthwise therealong and terminating at its ends adjacent the ends of said plate, said slot receiving the fastener for attaching the plate to said bracket, a shoulder extending lengthwise of the plate and adapted for abutting contact with the vertical edge of the vehicle mirror bracket, said plate defining a mirror mounting aperture located inward from one end of the plate and between the ends of said slot, said mirror mounting aperture being laterally offset from the longitudinal axis of said plate and said slot, said mirror mounting aperture being positionable inward toward the side of the vehicle and inward from the aperture in the mirror bracket segment for mirror retraction purposes.

2. The side view mirror claimed in claim 1 wherein said plate includes a marginal portion of greater vertical section than the remainder of the plate, said mirror mounting aperture located in said marginal portion of the plate.

* * * * *